(12) United States Patent
Cathey

(10) Patent No.: US 7,253,737 B2
(45) Date of Patent: *Aug. 7, 2007

(54) AUTOMATED ANTENNA TRIM FOR TRANSMITTING AND RECEIVING SEMICONDUCTOR DEVICES

(75) Inventor: David A. Cathey, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/968,424

(22) Filed: Oct. 18, 2004

(65) Prior Publication Data

US 2005/0062607 A1      Mar. 24, 2005

Related U.S. Application Data

(63) Continuation of application No. 09/558,581, filed on Apr. 26, 2000, now Pat. No. 6,806,812.

(51) Int. Cl.
*G08B 13/14* (2006.01)

(52) U.S. Cl. ............. 340/572.7; 343/703; 343/745; 343/749; 324/605; 324/708; 324/76.14; 324/76.74

(58) Field of Classification Search .............. None
See application file for complete search history.

(56) References Cited

U.S. PATENT DOCUMENTS

| | | | |
|---|---|---|---|
| 3,810,147 A | | 5/1974 | Lichtblau |
| 3,955,201 A | * | 5/1976 | Crump ................. 343/701 |
| 4,021,705 A | | 5/1977 | Lichtblau |
| 4,048,564 A | | 9/1977 | Gleeson, Jr. |
| 4,486,723 A | | 12/1984 | Lysobey |
| 4,498,076 A | | 2/1985 | Lichtblau |
| 4,560,445 A | | 12/1985 | Hoover et al. |
| 4,780,724 A | | 10/1988 | Sharma et al. |
| 4,924,238 A | * | 5/1990 | Ploussios ............. 343/802 |
| 5,187,488 A | * | 2/1993 | Van Der Vis ......... 343/747 |
| 5,299,264 A | | 3/1994 | Schotz et al. |
| 5,337,063 A | | 8/1994 | Takahira |
| 5,350,710 A | | 9/1994 | Hong et al. |
| 5,384,284 A | | 1/1995 | Doan et al. |
| 5,408,690 A | | 4/1995 | Ishikawa et al. |
| 5,420,596 A | | 5/1995 | Burrell et al. |
| 5,448,110 A | | 9/1995 | Tuttle et al. |

(Continued)

*Primary Examiner*—Benjamin C. Lee
(74) *Attorney, Agent, or Firm*—TraskBritt

(57) ABSTRACT

A radio frequency communication device and methods of testing and tuning an antenna attached thereto are disclosed. A radio frequency communication device comprises internal circuitry and an antenna having a plurality of antenna segments associated therewith. Each antenna segment is associated with the antenna in either series or parallel relation through at least one of a fuse and an antifuse. In testing and tuning, a comparison is made to indicate whether the antenna is too short or too long. If the antenna is too short, an antenna segment may be attached to the antenna by initiating an antifuse. If the antenna is too long, an antenna segment may be detached from the antenna by blowing a fuse. If it is indeterminate whether the antenna is too short or too long, an antenna segment may be either attached or detached, the test repeated, and the results of the repeated test compared with the prior test to determine whether the correct action was taken.

18 Claims, 4 Drawing Sheets

U.S. PATENT DOCUMENTS

| | | |
|---|---|---|
| 5,491,715 A | 2/1996 | Flaxl |
| 5,497,140 A | 3/1996 | Tuttle |
| 5,564,086 A | 10/1996 | Cygan et al. |
| 5,572,226 A | 11/1996 | Tuttle |
| 5,579,017 A * | 11/1996 | Smith .......................... 343/722 |
| 5,608,380 A | 3/1997 | Hogen Esch |
| 5,751,629 A | 5/1998 | Nova et al. |
| 5,777,581 A | 7/1998 | Lilly et al. |
| 5,784,687 A | 7/1998 | Itoh et al. |
| 5,822,714 A | 10/1998 | Cato |
| 5,861,809 A | 1/1999 | Eckstein et al. |
| 5,864,319 A | 1/1999 | Paulus |
| 5,943,016 A | 8/1999 | Snyder et al. |
| 5,963,144 A | 10/1999 | Kruest |
| 5,970,398 A | 10/1999 | Tuttle |
| 5,983,363 A | 11/1999 | Tuttle et al. |
| 6,005,519 A | 12/1999 | Burns |
| 6,005,891 A | 12/1999 | Chadwick et al. |
| 6,016,062 A * | 1/2000 | Nicollian et al. ........... 324/769 |
| 6,025,129 A | 2/2000 | Nova et al. |
| 6,028,564 A | 2/2000 | Duan et al. |
| 6,045,652 A * | 4/2000 | Tuttle et al. ................. 156/292 |
| 6,061,025 A | 5/2000 | Jackson et al. |
| 6,104,311 A | 8/2000 | Lastinger |
| 6,117,745 A * | 9/2000 | Krishnan .................... 438/381 |
| 6,310,579 B1 | 10/2001 | Meredith |
| 6,396,075 B1 * | 5/2002 | Krishnan ..................... 257/48 |
| 6,437,577 B1 | 8/2002 | Fritzmann et al. |
| 6,806,812 B1 * | 10/2004 | Cathey ................... 340/572.7 |

* cited by examiner

AUTOMATED ANTENNA TRIM FOR TRANSMITTING AND RECEIVING SEMICONDUCTOR DEVICES

CROSS-REFERENCE TO RELATED APPLICATION

This application is a continuation of application Ser. No. 09/558,581, filed Apr. 26, 2000, now U.S. Pat. No. 6,806,812, issued Oct. 19, 2004.

BACKGROUND OF THE INVENTION

1. Field of the Invention

The present invention relates generally to a method and apparatus for tuning a transmitting and receiving antenna to a resonant frequency. More particularly, the invention discloses an antenna, such as that used in conjunction with a radio frequency identification (RFID) tag, having a plurality of fuses or antifuses, or both, in conjunction therewith. The fuses and antifuses may be initiated to extend or shorten the antenna to tune to a resonant frequency.

2. State of the Art

Radio frequency identification (RFID) technology uses electromagnetic energy as a medium through which to send information. Small radio frequency communication systems, such as a RFID tag, may be affixed to various articles so that the articles may be easily tracked during movement from one point to another, or identified, such as through a sales transaction. Therefore, one may tag objects such as items, animals, and people, to be identified or tracked automatically via a reader. The reader may be connected to a host computer which may additionally contain data related to an object's identification code associated with the RFID tag. Furthermore, an RFID tag conventionally also contains programmed information about an object to which it is attached. Through the use of such information, RFID technology may be used to identify objects automatically and without manual handling operations as is required in most bar code systems. In a conventional RFID tag system, a receiver, a transmitter, an antenna, and memory are implemented. RFID tags, their use and operation are well known in the art.

Additionally, the general structures and methods of fabricating RFID tags are well known in the art. RFID tags are enabled to receive, store, and transmit article-identifying data with a remote base station. RFID tags have been implemented using a variety of methodologies to allow a user to perform any number of desired identification functions. For example, RFID tags may comprise read-only or read-write capacity. Additionally, passive RFID tags may be implemented with an internal power source, or without an internal power source, drawing their power from the radio frequency (RF) energy transmitted from the reader. As well, RFID tags may be configured to operate at low, medium or high frequencies, depending on the needs for a desired application. U.S. Pat. No. 5,777,581 to Lilly et al. (Jul. 7, 1998) even describes an RF semiconductor circuit that may selectively operate at low, medium and high frequencies by switching between three separate antenna systems.

To function with a given system, an antenna must be tuned to the internal circuitry and signals transmitted and received by the system. Tuning systems and circuitry for adjusting the internal antenna circuits of RFID tags and similar circuitry are also known in the art. As indicated in FIG. 1, conventional RFID antenna tuning systems comprise internal circuitry 2, such as that ordinarily found in an RFID tag, an antenna tuning circuit 4 coupled to the internal circuitry 2, and an antenna 6 coupled to the antenna tuning circuit 4. The antenna tuning circuit 4 conventionally compares a signal characteristic, such as signal frequency or amplitude, of a received signal with a similar or other characteristic of a signal within the internal circuitry 2. By making adjustments to the antenna tuning circuit 4 settings, the RFID circuit may be tuned to a resonant frequency to optimally receive signals from a remote system transmitting to the internal circuitry 2, and optimally transmit the internal circuitry 2's response. In this way, the received and transmitted signal amplitudes are maximized and, thus, more reliably interpreted by corresponding circuitry.

Adjustments to the antenna tuning circuit 4 may be made by the internal circuitry 2, or by a testing device during a testing process. In making adjustments to the RFID circuit settings to tune to a resonant frequency of a communication system, conventional antenna tuning circuits modify the impedance of the antenna tuning circuit 4 by adjusting a variable capacitive or variable inductive element, or both. Once a modification is made, or coincidental with the adjustment being made, the signal characteristics are again compared and more adjustments made until the resonant frequency settings have been determined. Examples of conventional radio frequency antenna communication systems using various forms of impedance adjustments are shown and described in U.S. Pat. Nos. 5,970,398 to Tuttle (Oct. 19, 1999); 5,777,581 to Lilly et al. (Jul. 7, 1998); 5,491,715 to Flaxl (Feb. 13, 1996; 5,448,110 to Tuttle et al. (Sep. 5, 1995); 4,780,724 to Sharma et al. (Oct. 25, 1988; and 4,486,723 to Lysobey (Dec. 4, 1984), the disclosures of which are hereby incorporated herein by reference.

The internal antenna tuning circuit components, however, undesirably add to the size of the device, particularly in RFID applications where a desire is for a smaller system. Additionally, by interposing capacitive and inductive components between the antenna and the internal circuitry, additional power is consumed in activating those elements, and additional heat is produced. Furthermore, radio frequency communication devices operating at higher frequencies (several hundred megahertz) are difficult to tune using variable circuit impedance elements such as inductors and capacitors. It is therefore desirable to have a small radio frequency transponder circuit, such as that used in RFID tags, which does not require an additional internal antenna tuning circuit so the overall system can consume less power, produce less heat and use less space.

BRIEF SUMMARY OF THE INVENTION

The present invention provides a method and apparatus for tuning a radio frequency antenna, such as that used in radio frequency identification (RFID) tags, to a semiconductor circuit using additional antenna segments coupled to the antenna by fuses and antifuses. According to a first embodiment of the invention, at least one antenna for a RFID tag is disclosed. The antenna comprises a main antenna portion, a plurality of antenna portions, each coupled to the main antenna portion by a fuse, and a plurality of antenna portions, each separated from the main antenna portion by an antifuse. A method of the present invention uses a testing device having probe hardware, software and antenna tuning hardware to test one of the responses of the antenna to a test signal and a signal transmitted from the RFID tag. Based upon the response of the antenna, the testing device may initiate a connect or disconnect operation to attach an additional antenna segment through an antifuse if the antenna is determined to be too short, or detach an antenna segment through a fuse if the antenna is determined to be too long. Alternatively, the testing device may do nothing if the antenna responds within specifications. Additionally, if the testing device determines that the antenna response is not within specifications but cannot determine whether the antenna is too long or too short, a method of the present invention has the testing device initiating either a fuse blow operation or an antifuse connect operation and then retests the antenna system to evaluate whether the antenna response improved or became worse as a result of the change. Further testing is based upon the response of the modified antenna. If all of the fuses have been blown, or all of the antifuses have been connected and the antenna still does not operate within specifications, the RFID tag is rejected. The antenna segments attached to the main antenna through fuses and antifuses may be attached in series or in parallel, though series connection is most preferred.

A second embodiment of the invention discloses an RFID tag having internal circuitry, a main antenna and a plurality of antenna segments, each coupled in series to the main antenna through a fuse. The antenna system may be intentionally fabricated such that at least one fused segment needs to be detached for the antenna to operate within specifications. A method of the present invention of testing the RFID tag includes testing the antenna using a testing device such that an antenna response is measured and a fuse is blown if the antenna is determined to be too long or out of specification limits.

A third embodiment of the invention discloses an RFID tag having internal circuitry, a main antenna and a plurality of antenna segments, each attachable to the main antenna in series through an antifuse. The antenna system may be intentionally fabricated such that at least one antifused segment needs to be attached for the antenna to operate within specifications. A method of the present invention of testing the RFID tag includes testing the antenna using a testing device such that an antenna response is measured and an antifuse is connected if the antenna is determined to be too short or out of specification limits.

A radio frequency communication system is disclosed comprising a processor, a memory device, an input, an output and a storage device, a transceiver and a plurality of RFID tags, each having internal circuitry, a main antenna and a plurality of antenna segments, each associated with the main antenna by at least one of a fuse and an antifuse.

BRIEF DESCRIPTION OF THE SEVERAL VIEWS OF THE DRAWINGS

The nature of the present invention as well as other embodiments of the present invention may be more clearly understood by reference to the following detailed description of the invention, to the appended claims, and to several drawings herein, wherein:

DETAILED DESCRIPTION OF THE INVENTION

Figure 1:
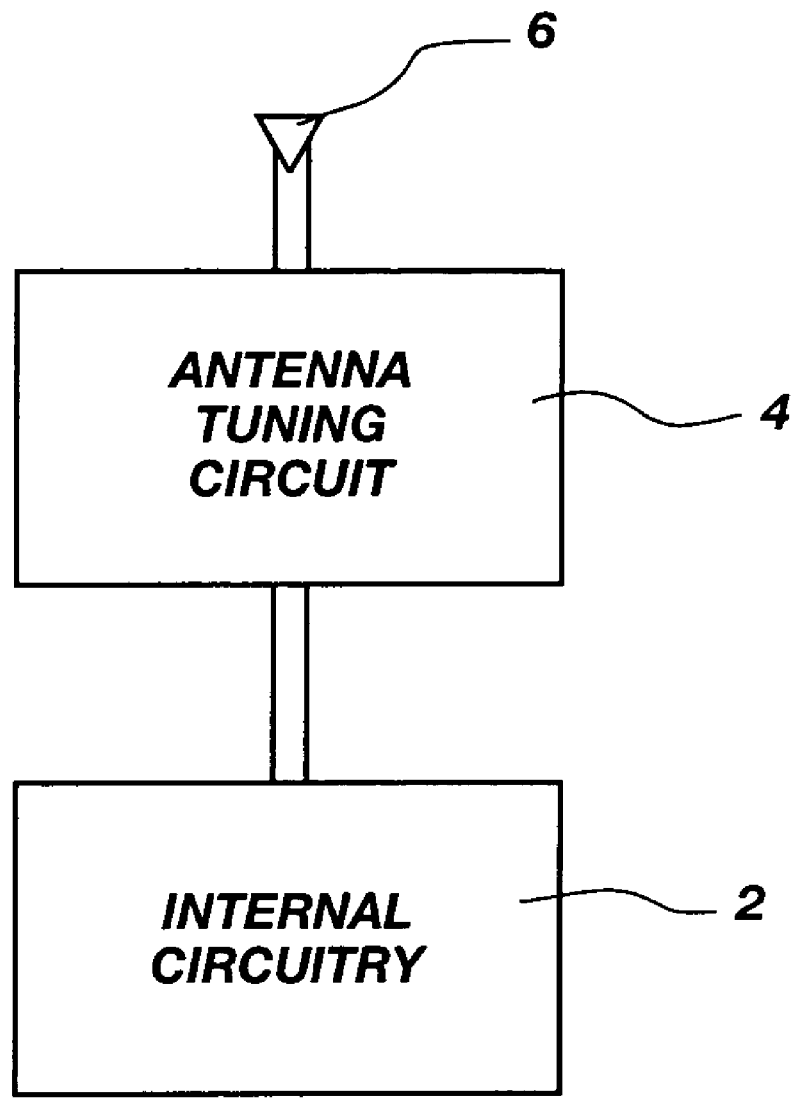
FIG. 1 is a block diagram of a prior art radio frequency identification (RFID) circuit.
Figure 2:
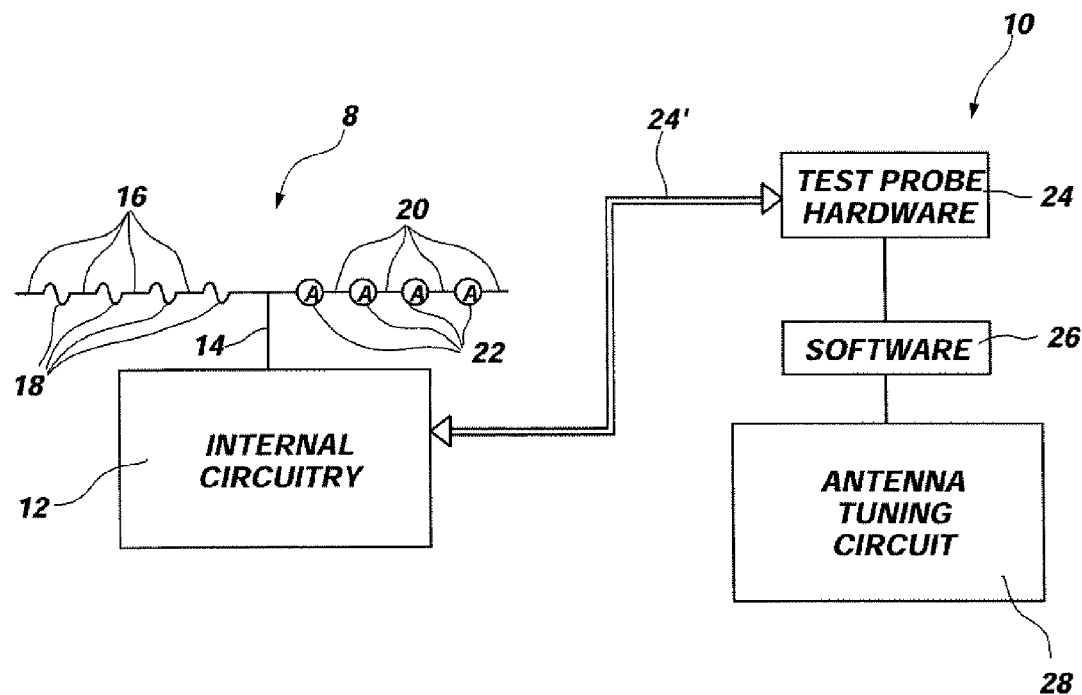
FIG. 2 is a block diagram of a RFID circuit according to a first embodiment of the present invention and a testing device.

Shown in FIG. 2 is a block diagram of a radio frequency identification (RFID) tag circuit 8 coupled to a testing device 10 according to a first embodiment of the present invention. The RFID tag circuit 8 comprises internal circuitry 12, a main antenna 14, a plurality of antenna segments 16 coupled to the main antenna 14 in series through fuses 18, and a plurality of antenna segments 20 coupleable to the main antenna 14 in series through antifuses 22. The internal circuitry 12 of the RFID tag circuit 8 may be one of many well known RFID tag or patch circuits known in the art such as that disclosed in U.S. Pat. No. 5,448,110 to Tuttle et al. (Sep. 5, 1995) (including a wake-up circuit, receiver, transmitter, control logic, memory and one or more batteries), or that disclosed in U.S. Pat. No. 5,497,140 to Tuttle (May 5, 1996) (including a sleep/wake-up circuit, receiver, transmitter, control logic, memory and no batteries). One of ordinary skill in the art will readily understand how to adapt the principles of the present invention to any radio frequency communication device known in the art.

Also shown in FIG. 2 is a testing device 10 comprising test probe hardware 24, software 26, and antenna tuning circuit 28. The test probe hardware 24 includes a probe 24' for coupling to the RFID tag circuit 8. Conventionally, a RFID tag circuit is tested prior to its initial use, and preferably after final packaging, to ensure that the main antenna 14 of the RFID tag circuit 8 is in tune with the internal circuitry 12. To do this, a testing device 10 measures the main antenna 14 response to various incoming and outgoing signals with respect to the internal circuitry 12. Conventionally, if it is determined that the antenna would respond more optimally with more or less impedance, a value of a variable inductor or capacitor is respectively increased or decreased to optimize the antenna tuning, or match the impedance of the antenna to the system. Such testing and tuning circuit adjustment devices and methods are well known to one of ordinary skill in the art.

According to this first embodiment of the present invention, rather than using variable capacitors or inductors to adjust the antenna response to signals, antenna segments 16 and 20 are associated with the main antenna 14 through fuses 18 and antifuses 22, respectively. Because the testing sequence is primarily controlled through test software 26, a software programmer of ordinary skill in the art may readily modify the software 26 to blow a fuse 18 or initiate an antifuse 22, rather than increase or decrease the inductance or capacitance of an antenna impedance matching circuit, in response to an antenna test. By removing a portion of an antenna coupled to the main antenna 14 through detaching an antenna segment 16 by blowing a fuse 18, the impedance of the antenna is decreased. By adding a portion of an antenna to the main antenna 14 through attaching an antenna segment 20 by initiating an antifuse 22, the impedance of the antenna is increased.

The fuses used for the antenna may be any of those commonly known in the art including, but not limited to, electrically-blown or laser-blown fuses, and may be fabricated on a semiconductor substrate, such as a VLSI fuse, or on a film, such as a RFID package overlay. It is believed that one of ordinary skill in the art will understand how to fabricate antenna segments 16 coupled to a main antenna 14 through fuses 18. Antifuses 22, their use and fabrication are similarly well known in the art.

It should be noted that drastic adjustments in the overall antenna layout and arrangement caused by adding or removing antenna segments 16 and 20 may affect the distribution and reception pattern of the main antenna 14. It is preferred that the antenna segments 16 and 20 be relatively short with respect to the overall length of the main antenna 14, and that the antenna segments 16 and 20 follow the general layout of the main antenna 14. Each antenna layout and desired application is different, however, and one of ordinary skill in the art will readily be able to incorporate additions or subtractions of antenna segments 16 and 20 into an existing antenna scheme.

Figure 3:
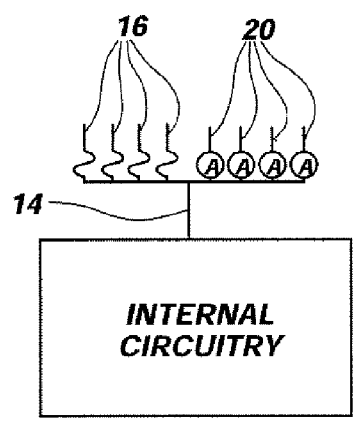
FIG. 3 is a block diagram of a RFID circuit depicting antenna segments coupled to a main antenna in parallel.
Figure 4:
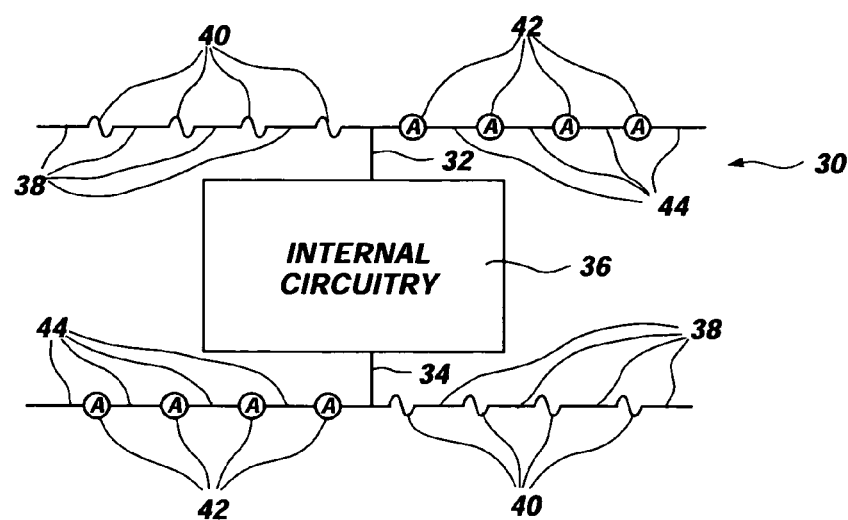
FIG. 4 is a block diagram of a RFID circuit depicting two main antennas, each having antenna segments coupled thereto.

As shown in FIG. 3, rather than associating the antenna segments 16 and 20 with the main antenna 14 in series through fuses 18 and antifuses 22 (as is shown in FIG. 2), antenna segments 16 and 20 may be associated with a main antenna 14 in parallel, though series association is most preferred. As shown in FIG. 4, an RFID tag 30 may have more than one main antenna 32 and 34 coupled to the internal circuitry 36. It is contemplated, however, that each main antenna 32 and 34 may have segments 38 and 44 associated therewith through fuses 40 or antifuses 42, or both.

Figure 5:
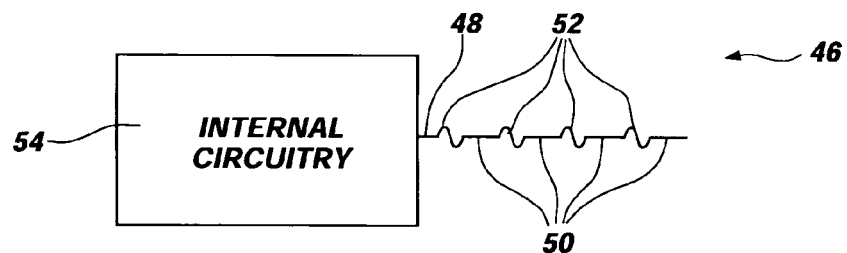
FIG. 5 is a block diagram of a RFID circuit according to a second embodiment of the present invention.

Shown in FIG. 5 is a block diagram of a RFID circuit 46 according to a second embodiment of the present invention. According to this second embodiment, RFID circuit 46 includes a plurality of antenna circuits 50 coupled in series to a main antenna 48. The combination of the main antenna 48 and fused antenna circuits 50 may be intentionally designed and fabricated to be longer than needed to tune to the internal circuitry 54 so that at least one fuse 52 will need to be blown during a testing operation. In this way, antifuses that lengthen the main antenna 48 by coupling antenna circuits 50 to the main antenna 48 will not be needed. In a testing operation, the RFID circuit 46 is tested and the antenna response monitored. If the antenna response, as interpreted by a testing device, indicates that the main antenna 48 is too long, a fuse 52 farthest from the main antenna 48 in the series is blown and the testing operation repeated with a second, third, etc., fuse 52 being blown as needed until the antenna response is within antenna specifications. If the antenna response, as interpreted by the testing device, indicates that the main antenna 48 is too short, or after all the fuses 52 are blown, the main antenna 48 is still too long, the RFID circuit 46 is rejected for use in its present application.

Figure 6:
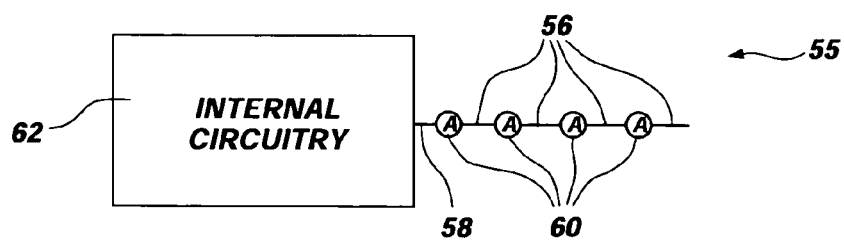
FIG. 6 is a block diagram of a RFID circuit according to a third embodiment of the present invention.

Shown in FIG. 6 is a block diagram of a RFID circuit according to a third embodiment of the present invention. According to this third embodiment, a RFID circuit 55 includes a plurality of antenna segments 56 associated in series with a main antenna 58. The main antenna 58 may be intentionally designed to be shorter than needed to tune the internal circuitry 62 so that at least one antifuse 60 will need to be initiated during a testing sequence. In this way, fuses that shorten the main antenna 58 by decoupling antenna segments 56 from the main antenna 58 will not be needed. In a testing operation, the RFID circuit 55 is tested and the antenna response monitored. If the antenna response, as interpreted by a testing device, indicates that the main antenna 58 is too short, a first antifuse 60 closest to the main antenna 58 is initiated and the testing operation repeated with a second, third, etc., antifuse 60 being initiated as needed until the antenna response is within antenna specifications. If the antenna response, as interpreted by the testing device, indicates that the main antenna 58 is too long, or after all the antifuses 60 have been initiated, the main antenna 58 is still too short, the RFID circuit 55 is rejected for use in its present application.

Figure 7:
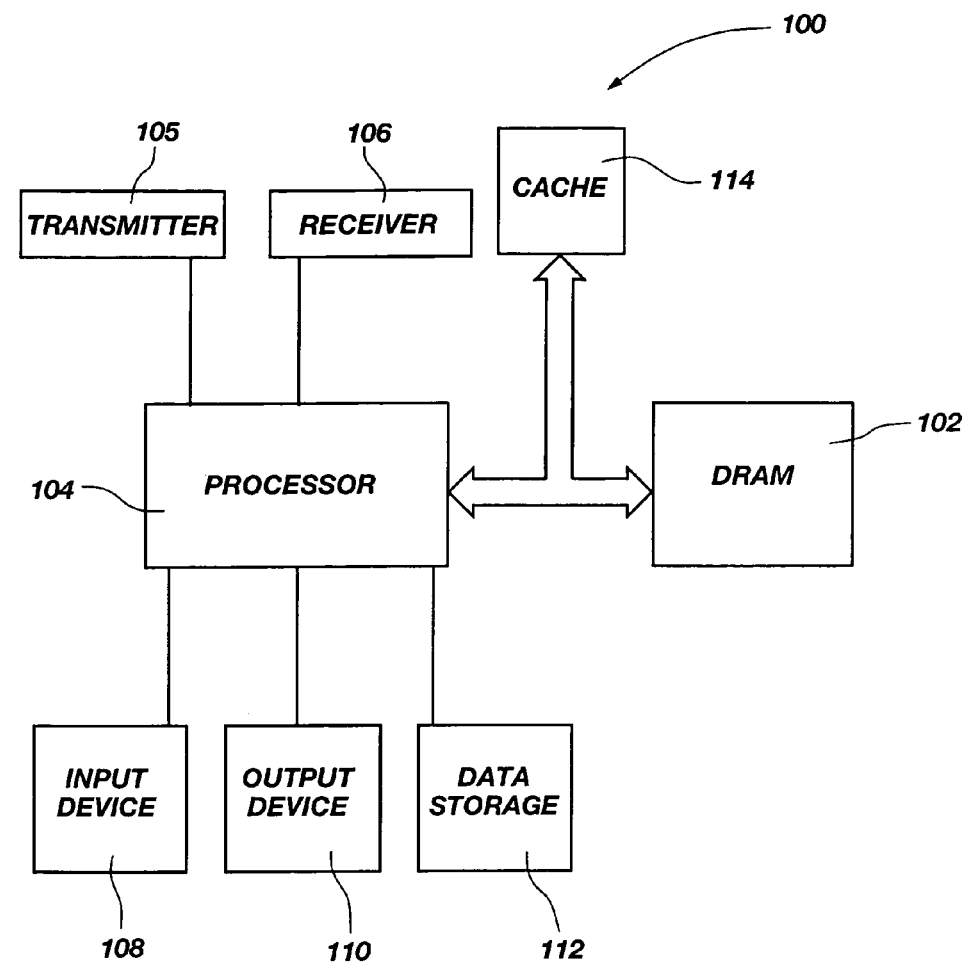
FIG. 7 is a block diagram of a radio frequency communication system.
Figure 7:
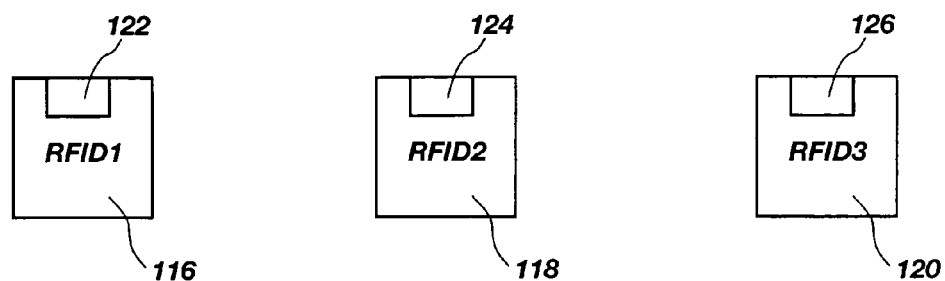

Shown in FIG. 7 is a block diagram of a radio frequency communication system 100 including RFID tags 116, 118 and 120, each having an antenna 122, 124 and 126 comprising a main antenna and antenna segments associated with the main antenna according to one or more embodiments of the present invention. The radio frequency communication system 100 includes a processor 104 for performing various computing functions, such as executing specific software to perform specific calculations or tasks and coordinate identification information. Additionally, the radio frequency communication system 100 includes one or more transmitters 105 and receivers 106 to send and receive information from the RFID tags 116, 118 and 120 to the processor 104. The radio frequency communication system 100 also includes one or more input devices 108, such as a keyboard or a mouse, coupled to the processor 104 to allow an operator to interface with the radio frequency communication system 100. The radio frequency communication system 100 also includes one or more output devices 110 coupled to the processor 104, such output devices including such outputs as a printer, a video terminal or a network connection. One or more data storage devices 112 are also conventionally coupled to the processor 104 to store or retrieve data from external storage media. Examples of conventional storage devices 112 include hard and floppy disks, tape cassettes, and compact disks. The processor 104 is also conventionally coupled to a cache memory 114, which is usually static random access memory ("SRAM"), and to DRAM 102.

Though depicted as dipole or linear antennas in the various embodiments herein, it will be understood by one of ordinary skill in the art that the principles of this invention may be readily applied to any antenna or antenna array configuration, such as a loop, coil or a bowtie antenna. Furthermore, though a particular number of antenna segments may have been shown as illustrative of the present invention, it will be understood by one of ordinary skill in the art that any number of antenna segments, and antenna segments of varying sizes, may be associated with a main antenna through fuses and antifuses. One of ordinary skill in the art may readily adapt the principles of the present invention to a particular RFID architecture, layout and application. Additionally, as will be clear to one of ordinary skill in the art, because antennas in the art are formed in embodiments on a semiconductor substrate, and in embodiments off the semiconductor substrate but in electrical contact with the substrate, and fuses and antifuses may be formed either on or off of a semiconductor substrate, the present invention may readily be formed on or off of a semiconductor substrate.

By adjusting the tuning of an RFID circuit antenna through adjusting the length of the antenna rather than adjusting the values of capacitive and inductive components attached to the antenna, less power is consumed, less heat is produced and devices operating at higher frequencies are more easily tuned.

Although the present invention has been shown and described with reference to a particular preferred embodiment, various additions, deletions and modifications that are obvious to a person skilled in the art to which the invention pertains, even if not shown or specifically described herein, are deemed to lie within the scope of the invention as encompassed by the following claims.

What is claimed is:

1. A method of tuning an antenna of a radio frequency communication device, the method comprising:
   evaluating an antenna response to at least one test signal; and
   in response to an evaluation result:
      accepting the radio frequency communication device when the evaluation meets a first criteria;
      rejecting the radio frequency communication device when the evaluation result meets second criteria;

coupling an antenna segment to the antenna using an antifuse when the evaluation result meets third criteria; and detaching an antenna segment from the antenna using a fuse when the evaluation result meets fourth criteria.

2. The method of claim 1, wherein accepting the radio frequency communication device occurs when the evaluation indicates the antenna meets specified criteria.

3. The method of claim 1, wherein rejecting the radio frequency communication device occurs when the evaluation indicates the antenna is too long and there is no antenna segment coupled to the antenna through a fuse.

4. The method of claim 1, wherein rejecting the radio frequency communication device occurs when the evaluation indicates the antenna is too short and there is no antenna segment associated with the antenna through an uninitiated antifuse.

5. The method of claim 1, wherein coupling the antenna segment to the antenna occurs when the evaluation indicates the antenna is too short and there is an antenna segment associated with the antenna through an uninitiated antifuse.

6. The method of claim 1, wherein coupling the antenna segment to the antenna occurs when the evaluation is indeterminate as to whether the antenna is too short, too long, or meets specified criteria.

7. The method of claim 6, further comprising:
re-evaluating the antenna response with the coupled antenna segment in response to at least another test signal;
comparing a re-evaluation response with the evaluated antenna response; and
performing at least one of:
accepting the radio frequency communication device;
rejecting the radio frequency communication device;
coupling an antenna segment to the antenna when the comparison indicates that the re-evaluation response improved but the antenna response is still not within the specified criteria; and
detaching an antenna segment from the antenna when the comparison indicates that the re-evaluation response did not improve.

8. The method of claim 1, wherein detaching the antenna segment from the antenna occurs when the evaluation indicates the antenna is too long and there is an antenna segment coupled to the antenna through a fuse.

9. The method of claim 1, wherein detaching the antenna segment from the antenna occurs when the evaluation is indeterminate as to whether the antenna is too short, too long, or meets specified criteria.

10. The method of claim 9, further comprising:
re-evaluating the antenna with a coupled antenna segment in response to at least another test signal;
comparing a re-evaluation response with the evaluated antenna response; and
performing at least one of:
accepting the radio frequency communication device;
rejecting the radio frequency communication device;
coupling an antenna segment to the antenna when the comparison indicates that the re-evaluation response did not improve; and
detaching an antenna segment from the antenna when the comparison indicates that the re-evaluation response improved but the antenna response is still not within the specified criteria.

11. The method of claim 1, further comprising evaluating an antenna response to at least another test signal if the evaluation of the antenna response to the at least one test signal did not indicate that the radio frequency communication device was accepted or rejected.

12. The method of claim 11, further comprising, in response to an evaluation result from the evaluation of the antenna response to the at least another test signal, performing one of:
accepting the radio frequency communication device;
rejecting the radio frequency communication device;
coupling an antenna segment to the antenna; and
detaching an antenna segment from the antenna.

13. A method of testing a radio frequency communication device comprising:
comparing at least one characteristic of an antenna response to at least one test signal with at least one specification value; and
initiating a fuse blow sequence to detach an antenna segment associated with an antenna when the comparison yields a first criteria and initiating an antifuse initiation sequence to attach an antenna segment associated with the antenna if the comparison yields a second criteria.

14. The method of claim 13, further comprising accepting the radio frequency communication device when the comparison indicates that the at least one characteristic is within an acceptable variance from the at least one specification value.

15. The method of claim 13, further comprising rejecting the radio frequency communication device when the comparison indicates that the at least one characteristic is not within an acceptable variance and an appropriate adjustment to a length of the antenna is unavailable.

16. The method of claim 13, wherein when the comparison does not indicate whether the at least one characteristic is within an acceptable variance of the at least one specification value, after initiating one of the fuse blow sequence and the antifuse initiation sequence, comparing at least one characteristic of an antenna response to at least one test signal with at least one specification value being repeated as a result of a repeated comparison being compared with a result of a first comparison, and making a determination as to whether a result of a second comparison is better than the result of the first comparison.

17. The method of claim 16, further comprising, when the result of the second comparison is better than the result of the first comparison, initiating another fuse blow sequence when the fuse blow sequence was initiated in response to the first comparison, and initiating another antifuse initiation sequence when the antifuse initiation sequence was initiated in response to the first comparison.

18. The method of claim 13, further comprising, when the at least one characteristic was not within an acceptable variance of the at least one specification value:
comparing the at least one characteristic of the antenna response to at least another test signal with at least one specification value; and
again initiating one of the fuse blow sequence to attach and the antifuse initiation sequence to detach an antenna segment associated with the antenna in response to the comparing the at least one characteristic of the antenna response to the at least another test signal.

* * * * *